United States Patent
Allen et al.

(10) Patent No.: US 8,315,797 B2
(45) Date of Patent: Nov. 20, 2012

(54) NAVIGATION SYSTEM WITH SWIVEL SENSOR MOUNT

(75) Inventors: David W. Allen, Davisburg, MI (US); Larry E. Spencer, Lake Orion, MI (US)

(73) Assignee: Navigation Solutions, LLC, Plano, TX (US)

( * ) Notice: Subject to any disclaimer, the term of this patent is extended or adjusted under 35 U.S.C. 154(b) by 1085 days.

(21) Appl. No.: 12/139,942

(22) Filed: Jun. 16, 2008

(65) Prior Publication Data
US 2008/0312829 A1 Dec. 18, 2008

Related U.S. Application Data

(60) Provisional application No. 60/944,260, filed on Jun. 15, 2007.

(51) Int. Cl.
*G06C 21/00* (2006.01)

(52) U.S. Cl. ........ 701/444; 701/400; 701/408; 701/469; 701/500; 248/481; 248/663; 340/425.5; 340/438

(58) Field of Classification Search .................... None
See application file for complete search history.

(56) References Cited

U.S. PATENT DOCUMENTS

| | | | | |
|---|---|---|---|---|
| 4,196,319 A | * | 4/1980 | Gates | 379/454 |
| 5,392,350 A | * | 2/1995 | Swanson | 379/446 |
| 5,467,271 A | * | 11/1995 | Abel et al. | 702/5 |
| 6,023,229 A | * | 2/2000 | Bugno et al. | 340/693.5 |
| 6,173,933 B1 | * | 1/2001 | Whiteside et al. | 248/276.1 |
| 6,454,229 B1 | * | 9/2002 | Voigt et al. | 248/182.1 |
| 6,456,194 B1 | * | 9/2002 | Carlson et al. | 340/440 |
| 6,532,419 B1 | | 3/2003 | Begin et al. | |
| 6,801,855 B1 | * | 10/2004 | Walters et al. | 701/410 |
| 6,840,487 B2 | * | 1/2005 | Carnevali | 248/346.06 |
| 7,219,867 B2 | * | 5/2007 | Kalis et al. | 248/288.31 |
| 7,239,942 B2 | * | 7/2007 | Park et al. | 701/1 |
| 7,483,789 B1 | * | 1/2009 | Walters et al. | 701/428 |
| 7,516,928 B2 | * | 4/2009 | Kalis et al. | 248/288.31 |
| 2001/0023915 A1 | * | 9/2001 | Hailson | 248/288.51 |
| 2002/0063197 A1 | * | 5/2002 | Voigt et al. | 248/660 |
| 2004/0145457 A1 | * | 7/2004 | Schofield et al. | 340/425.5 |
| 2004/0254722 A1 | | 12/2004 | Spencer et al. | |
| 2005/0038597 A1 | * | 2/2005 | Kaneko et al. | 701/200 |
| 2005/0085952 A1 | * | 4/2005 | Park et al. | 701/1 |
| 2006/0061008 A1 | * | 3/2006 | Karner et al. | 264/250 |
| 2007/0005230 A1 | * | 1/2007 | Sera | 701/117 |
| 2007/0012839 A1 | | 1/2007 | Kalis et al. | |
| 2007/0012840 A1 | | 1/2007 | Kalis et al. | |
| 2007/0117419 A1 | | 5/2007 | Kalis et al. | |
| 2007/0162229 A1 | | 7/2007 | McCarthy et al. | |
| 2007/0171037 A1 | * | 7/2007 | Schofield et al. | 340/438 |
| 2009/0070038 A1 | * | 3/2009 | Geelen et al. | 701/216 |
| 2010/0193649 A1 | * | 8/2010 | Wiegers | 248/183.1 |

* cited by examiner

*Primary Examiner* — Khoi Tran
*Assistant Examiner* — Jonathan L Sample
(74) *Attorney, Agent, or Firm* — Carlson, Gaskey & Olds PC

(57) ABSTRACT

A navigation system provides sensors and a user interface mounted in a single unit while allowing individual users to make adjustments to the user interface without affecting the functionality of the device. This is accomplished by mounting the orientation sensitive sensors (e.g. accelerometers, gyros, etc) rigidly to a mounting bracket rigidly mounted to the vehicle (such as to the dashboard). The sensors are mounted within a ball rigidly mounted to the bracket and the ball is secured within a rotatable socket on the user interface enclosure. In this manner, the user interface enclosure can rotate on the ball, but the orientation of the sensors relative to the vehicle will remain the same.

20 Claims, 2 Drawing Sheets

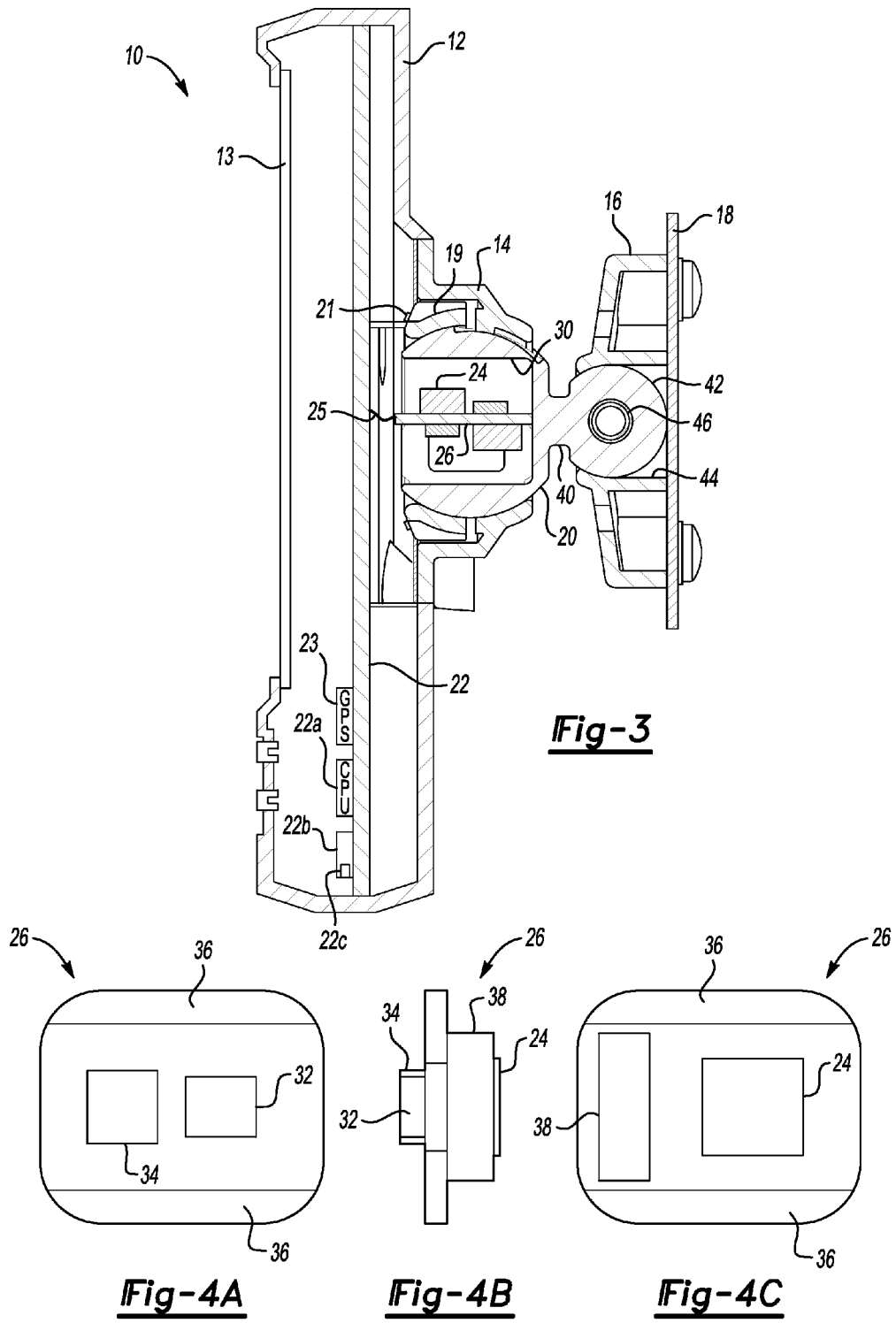

NAVIGATION SYSTEM WITH SWIVEL SENSOR MOUNT

This application claims priority to U.S. Provisional Application Ser. No. 60/944,260, filed Jun. 15, 2007.

BACKGROUND OF THE INVENTION

The present invention relates to improvements to a vehicle navigation system. Previous navigation systems were able to adjust the angle and/or position of their user interfaces relative to the mounting system utilized. A disadvantage of previous systems was that the user interface and sensing means were enclosed in separate units. The sensing means for navigation must be mounted in a fixed location to ensure proper functionality and the user interface must be mounted in another location visible to the operator.

SUMMARY OF THE INVENTION

The present invention overcomes the disadvantage of previous navigation systems by having the sensing means and the user interface mounted in a single unit while allowing individual users to make adjustments to the user interface without affecting the functionality of the device.

This is accomplished by mounting the orientation sensitive sensors (e.g. accelerometers, gyros, or other inertial sensors, etc) rigidly to a mounting bracket rigidly mounted to the vehicle (such as to the dashboard). In order to conserve space, the sensors are mounted within a ball rigidly mounted to the bracket and the ball is secured within a rotatable socket on the user interface enclosure. In this manner, the user interface enclosure can rotate on the ball, but the orientation of the sensors relative to the vehicle will remain the same.

BRIEF DESCRIPTION OF THE DRAWINGS

Other advantages of the present invention can be understood by reference to the following detailed description when considered in connection with the accompanying drawings wherein:

FIG. 3 illustrates cross sectional view of the device.

FIG. 4A illustrates a first view of the gyro printed circuit board (PCB).

FIG. 4B illustrates a second view of the sensor PCB.

FIG. 4C illustrates a third view of the sensor PCB.

DETAILED DESCRIPTION OF THE PREFERRED EMBODIMENT

Figure 1:
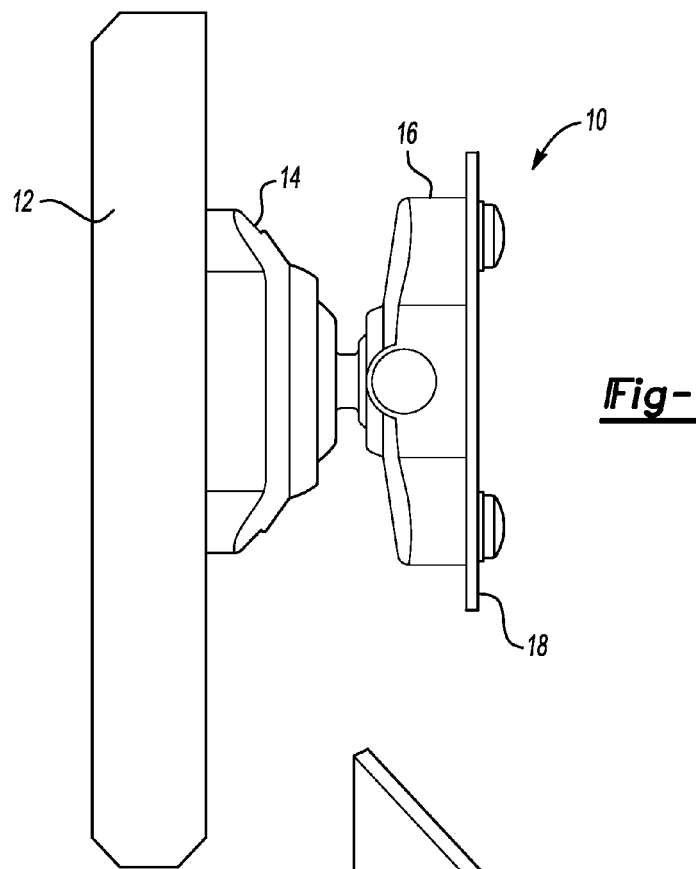
FIG. 1 is a side view of a navigation system with the mounting arrangement according to one embodiment of the present invention.

A vehicle navigation system 10 is shown in FIG. 1. The vehicle navigation system 10 includes a user interface enclosure 12 having a socket 14 providing a pivotable connection to a mounting bracket 16 connected to an in-dash bracket 18.

Figure 2:
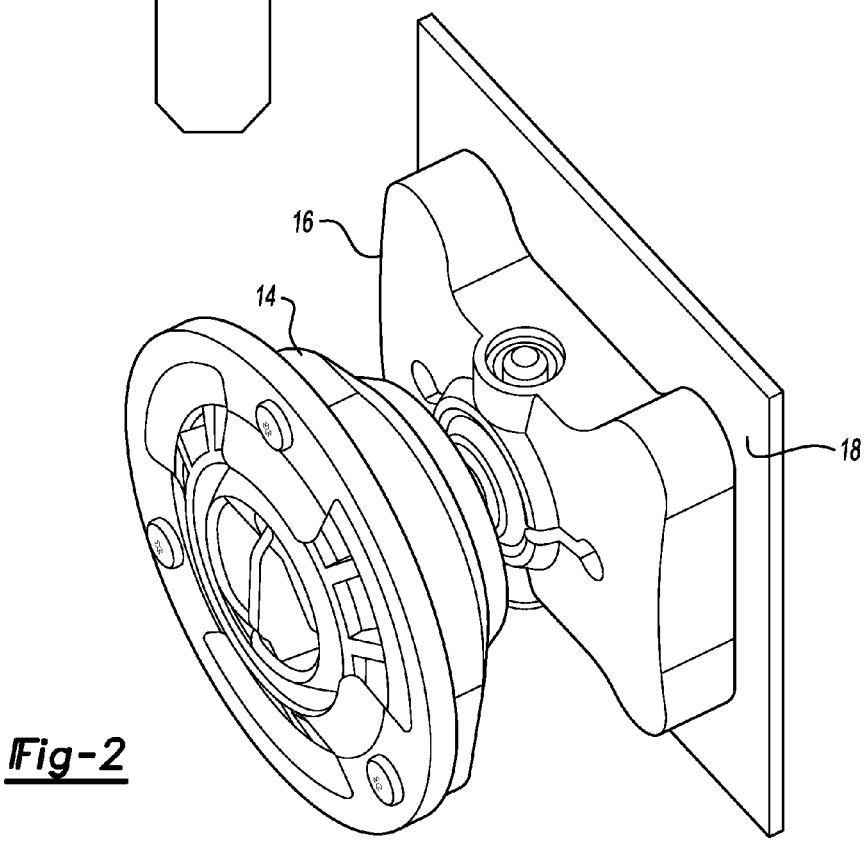
FIG. 2 is a perspective view of the navigation system of FIG. 1, without the user interface enclosure.

FIG. 2 illustrates the socket 14, mounting bracket 16 and in-dash bracket 18 without the user interface enclosure 12.

Referring to FIG. 3, the vehicle navigation system 10 includes a mounting bracket 16, a fixed ball 20, a rotating socket 14, and a user interface enclosure 12 with multiple parts. The rotating socket 14 is fixed to the user interface enclosure 12 and retains the fixed ball 20. A retainer 19 and spring 21 retain the fixed ball 20 within the rotating socket 14 and permit relative rotation by the user pivoting the user interface enclosure 12, while maintaining the relative orientation between the fixed ball 20 and the socket 14 when the user releases the user interface enclosure 12.

The user interface enclosure 12 includes a display 13 for providing a user interface to the user. The user interface enclosure 12 also houses a main printed circuit board (PCB) 22 having a CPU 22a and memory 22b (shown schematically in FIG. 3) fixed or connected thereto. The memory 22b may be RAM, ROM, flash RAM, hard drives, or any other electronic, magnetic, optical or other computer readable medium or combinations thereof. The memory 22b stores computer programs which when executed by the CPU 22a perform the functions described herein. The memory 22b also stores a map database 22c accessible by the CPU 22a for use in navigation. A GPS receiver 23 is also mounted on or connected to the main PCB 22 and provides location information to the CPU 22a.

The CPU 22a generates a user interface which is displayed to the user on display 13. The CPU 22a generates instructions, such as turn-by-turn instructions, based upon the information from the sensors (gyro 24 and accelerometer 34), the GPS receiver 23 and the map database 22c to display to the user on display 13.

A cable 25 connects the main PCB 22 to a sensor PCB 26. The cable 16 possesses some degree of slack to allow the user interface enclosure 12 to move relative to the PCB 22. The rotating socket 14 receives the fixed ball 20 and provides a means for adjusting the user interface enclosure 12 in a plurality of directions relative to the mounting bracket 16. Obviously, as shown, the ball 20 does not have to be a complete sphere, but only has to be suitable to provide a ball and socket connection.

The mounting bracket 16 as shown in FIG. 3 is rigidly attached to a fixed position in the vehicle. The fixed ball 20 is rigidly mounted to the mounting bracket 16. The fixed ball 20 contains a hollow portion 30 with the sensor PCB 26 mounted in the hollow space. The sensor PCB 26 is mounted in a fixed orientation within the hollow portion 30 of the fixed ball 20.

As can be seen in FIG. 3, the fixed ball 20 is connected via a neck portion 40 to a second ball 42. The second ball 42 is retained within a recess 44 of the mounting bracket 16 and held in a fixed orientation relative to the mounting bracket 16 and in-dash bracket 18 by a fastener 46 (such as a screw). During installation, the second ball 42 is pivoted and rotated until the sensor PCB 26 in the fixed ball 20 is in a desired orientation relative to the vehicle (or relative to earth). The fastener 46 is then tightened to lock the second ball 42 rigidly in a fixed orientation relative to the mounting bracket 16, the in-dash bracket 18 and the vehicle, which in turn locks the fixed ball 20 in a fixed orientation. For example, it is preferred that the axis of the gyro 24 is generally parallel to gravity. It may be desirable that the axes of the accelerometer 34 are aligned with the axes of the vehicle, but this is less important than the requirement that they simply be fixed because the axes of the vehicle can be subsequently translated to the axes of the accelerometer via software.

The sensor PCB 26 contains a plurality of affixed devices as shown in FIGS. 4a, 4b and 4c. As shown in FIG. 4a, the sensor PCB 26 is mounted to an accelerometer 34 and an analog to digital converter 32. As shown in FIG. 4c, a gyro 24 and a connector 38 are attached to the sensor PCB 26. The connector 38 attaches the cable 16 from the main PCB 22 to the sensor PCB 26. FIG. 4b shows an end view of the sensor PCB 26. The sensor PCB 26 has keep out zones 36 in this embodiment.

This embodiment overcomes the disadvantage of the prior art. It allows the sensing means and user interface enclosure 12 to be conveniently enclosed in the same unit, while maintaining a high degree of adjustability of the user interface enclosure 12. This advantage is accomplished through locating the sensing means within the fixed ball 20, which is rigidly attached to the vehicle, through the mounting bracket 16, and locating the rotating socket 14 on the user interface enclosure 12. This permits pivoting of the user interface enclosure, while maintaining a fixed orientation of the sensors on the sensor PCB 26.

Although a preferred embodiment of this invention has been disclosed, a worker of ordinary skill in this art would recognize that certain modification would come within the scope of this invention.

What is claimed is:

1. A system comprising:
   a bracket for rigidly connecting to a vehicle;
   a ball extending rigidly from the bracket;
   at least one sensor rigidly mounted to the ball;
   a housing having a socket rotatably connected to the ball; and
   a display mounted to the housing.

2. The system of claim 1 wherein the at least one sensor includes an accelerometer.

3. The system of claim 1 wherein the at least one sensor includes a gyro.

4. The system of claim 1 further including a processor within the housing, the at least one sensor connected to the processor.

5. The system of claim 4 further including a map database stored within the housing and accessible by the processor for navigation.

6. The system of claim 5 wherein the display provides a user interface generated by the processor.

7. The system of claim 6 wherein the at least one sensor includes an accelerometer.

8. The system of claim 7 wherein the at least one sensor includes a gyro.

9. The system of claim 8 wherein the at least one sensor includes a GPS receiver.

10. The system of claim 1 wherein the ball is connected to the bracket by a lockable, pivotable joint.

11. A system comprising:
    a bracket assembly for connecting to a vehicle;
    at least one sensor mounted to the bracket assembly;
    a housing pivotably connected to the bracket assembly; and
    a display mounted to the housing and configured to pivot together with the housing relative to the bracket assembly, wherein the at least one sensor is at least partially disposed within the housing.

12. The system of claim 11 wherein the at least one sensor includes an accelerometer, such that the accelerometer maintains a constant orientation relative to the vehicle and the bracket assembly throughout a range of pivoting between the housing and the bracket assembly.

13. The system of claim 12 wherein the at least one sensor includes a gyro.

14. The system of claim 12 further including a processor within the housing, the at least one sensor connected to the processor.

15. The system of claim 14 further including a map database stored within the housing and accessible by the processor for navigation.

16. The system of claim 15 wherein the display provides a user interface generated by the processor.

17. The system of claim 11 wherein the at least one sensor is connected to the bracket by a lockable, pivotable joint.

18. The system of claim 11 wherein the at least one sensor includes a GPS receiver.

19. The system of claim 1 wherein the at least one sensor rotates together with the ball.

20. The system of claim 11 wherein a position of the at least one sensor is fixed relative to the bracket assembly.

* * * * *